Dec. 1, 1959  K. SCHERRER  2,914,991
METHOD AND MEANS FOR COPYING WORK PIECES
Filed July 2, 1957  3 Sheets-Sheet 1

INVENTOR.
KURT SCHERRER
BY
Leon M. Strauss
AGT.

United States Patent Office 2,914,991
Patented Dec. 1, 1959

2,914,991

METHOD AND MEANS FOR COPYING WORK PIECES

Kurt Scherrer, Rorschacherberg, Switzerland, assignor to Starrfrasmaschinen A.G., Rorschacherberg, Switzerland Application July 2, 1957, Serial No. 669,577

Claims priority, application Switzerland July 7, 1956

3 Claims. (Cl. 90—13.1)

The present invention relates to a method and means for copying lengthy workpieces with non-planar surfaces.

For the production of lengthy workpieces having non-planar, i.e. arcuate or twisted surfaces, such as all-metal airplane wings, wing spars, airplane fuselages, fairings, and ailerons, it is well known to use copying methods according to which the template is arranged either on a workpiece slide, that is immediately adjacent the workpiece or on a separate template slide, which extends parallel with respect to the workpiece slide and is driven simultaneously therewith.

For copying a workpiece in accordance with the shape of a template, which is explored or scanned by a feeler or tracer, two principal methods are in use. In accordance with one of these methods the template and the workpiece are scanned and machined, respectively, in longitudinal direction.

At the location where the longitudinal movement is reversed from one direction into the other a step-wise feed movement in transverse direction is carried out such that the template will be scanned along a plurality of parallel and longitudinal courses or paths spaced from each other by one feed step.

The milling or grinding tool carrying out movements with respect to the workpiece equal to those of the feeler or scanning means on the template can be either finger-shaped to machine the workpiece by means of its tip, or a disk or roll type tool may be employed, whose axis of rotation extends substantially in the direction of a step by step feed movement, i.e. transversely with respect to the workpiece. In this case the tool will operate on the workpiece along the circumference thereof.

According to another conventional method, the template is explored transversely with respect to its longitudinal axis, whereas the feed movement is carried out in step-wise fashion and progresses in longitudinal direction of the template. Since workpieces of this kind are usually profiled in transverse direction thereof they will, if produced in accordance with this latter method, be machined in successive profiled portions until they will correspond over their full length to the shape and profile of the template.

When making use of this method the same kind of tools (finger-shaped or disk-shaped) may be used as described in connection with the first mentioned method. The axis of rotation of disk and roll type tools extending, however, substantially parallel with respect to the longitudinal axis of the workpiece, i.e. transversely with respect to the machining direction.

A disadvantage inherent in both the above mentioned methods is constituted by the fact that if the workpiece is to be machined during the forward as well as the return stroke of its reciprocating or oscillatory movement the machining operation will be carried out alternately in equidirectional and contra-directional fashion.

Apart from the fact that both of these types of operation have their own individual deficiencies a workpiece produced by alternate equidirectional and contra-directional movements will usually show poor surface quality due to the fact that the conditions for the removal of the machining chips change from one course or path of the tool over the workpiece to the next course thereof.

All conventional copying methods employing a three dimensional template have the drawback in common that the table or slide surface required for machining the workpiece and supporting the template is considerably larger than the surface required for supporting the workpiece alone. Alternatively a second slide or table of equal size as the workpiece table is necessary to support the template. Consequently, a relatively large space is required to accommodate and set up a conventional copying machine which in turn means high production costs. A further cost increasing factor lies in the size of the template itself, especially if the workpiece is of relatively great length.

It is therefore an object of the present invention to provide means conducive to a highly economical method of copying lengthy workpieces for a template which will lead to greatly reduced production cost.

A further object of the present invention is the provision of means affording a simplified and very efficacious method of copying a workpiece from a template which may be considerably reduced or made smaller in size in one of its dimensions, whereas the remaining two dimensions of the template are of the same size as and correspond to those of the workpiece.

A further object of the present invention is to provide a novel method of copying a lengthy workpiece according to a template, wherein the speed at which the workpiece is machined in one of its directions is greater than the speed at which the template is explored or scanned in the corresponding direction thereof.

A further object of the present invention is the provision of means rendering the possibility of copying lengthy workpieces from a template by carrying out relative movements between said template and a scanning device for scanning the template and between a workpiece and a tool for machining said workpiece in a manner to correlate these respective relative movements in two dimensions at equal magnitude of relative movement.

A further object of the present invention is to provide means facilitating the employment of a template which in one of its three dimensions is different in size than the corresponding dimension of the workpiece to be produced therefrom.

A further object of the invention is to provide means contributing to a template structure, which is shorter in length than the workpiece to be copied therefrom.

Still another object of the present invention is to provide means ensuring synchronized relative movements of different speed between a template and a scanning device and between a workpiece and a tool.

Another object of the present invention is the provision of means permitting a variation of the difference in speed of movement of a workpiece support with respect to a template support.

A further object of the present invention is the provision of means contriving to accurately bound the movement of a workpiece slide and of a template slide in accordance with predetermined contours of a template and a workpiece to thereby markedly decrease the time required for machining said workpiece.

Additional objects and advantages of the present invention will become further apparent from the following detailed description, reference being made to the accompanying drawings showing a preferred embodiment of the invention.

Figure 1:
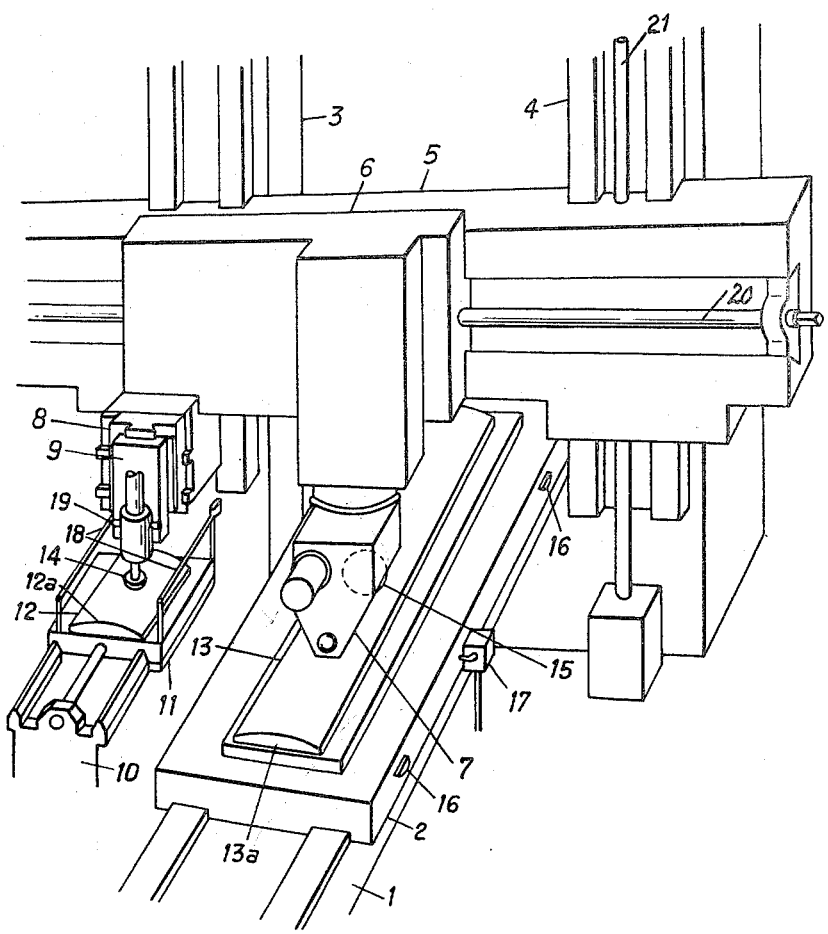
Fig. 1 is a perspective and fragmentary view of a machine for copying lengthy workpieces with non-planar surfaces embodying the present invention.

Referring more particularly to the drawings wherein like reference numerals designate similar parts there is disclosed in Fig. 1 a machine or device constructed according to the present invention, which may be a milling or grinding machine having a bed 1, a workpiece slide 2, two supporting standards 3 and 4, respectively, and a cross-traverse 5 slidable in vertical direction along the standards 3 and 4. The cross-traverse 5 carries a horizontally movable cross slide or saddle 6 which supports a milling head 7 rotatable about a vertical axis. Moreover, the cross-slide 6 supports a horizontally movable adjustment slide 8, which carries the vertically movable copying device 9.

In front of standard or column 3 a bed 10 is arranged to extend parallel to bed 1. This bed 10 supports a longitudinally movable template slide 11. To template slide 11 a template 12 is attached while the workpiece slide 2 carries a lengthy workpiece 13. It will be noted from Fig. 1 that the length of the template 12 is only a fraction of the length of the workpiece 13. The template slide 11 and the workpiece slide 2 are operatively connected with each other over a variable speed transmission or a speed gear 25 which will be described in more detail later on. This speed gear is arranged in such manner that the rates of speed of workpiece slide 2 and template slide 11 correspond to the ratio of length of workpiece 13 and template 12.

Consequently, the respective rates of speed will be such that the full length of the relatively short template will be scanned within the same period or unit of time as the relatively great length of the workpiece 13.

The copying device 9 carries a feeler member 14 which is adapted to scan the template over the length and width thereof. The vertical movement of this feeler member during the exploration of the template over the length and width thereof is transmitted by conventional means to the cross-traverse 5 via the spindle 21 and milling or grinding head 7, which latter supports a milling or grinding tool 15.

The workpiece slide 2 is provided with stop members 16 which cooperate with a reversing mechanism 17. Moreover, the template slide 11 is provided with contact rails 18 extending substantially parallel with respect to the longitudinal edges of the template 12, and which are adapted to cooperate with contacts 19 connected to the copying device 9. The function of the contact rails 18 and the contacts 19 is also to reverse the movement of the template slide 11 and thus the movement of the workpiece slide 2 operatively connected with the former.

Consequently a reverse or return movement in longitudinal direction is either possible by the stop members 16 or by means of contact 19 and contact rails 18. Contact rails 18 and contacts 19 have, however, a specific purpose in that they serve to limit the longitudinal movements of the two slides 2 and 11 for workpieces having longitudinal edges converging toward each other from one end to the other, i.e. they serve to machine workpieces with decreasing width from one end to the other. When milling or grinding the workpiece adjacent its longitudinal edge portions, these contact rails and contacts permit to reverse or return the movement of the slides as soon as the template or tool reaches a point immediately above the tapering edge of the workpiece or template, respectively.

With workpieces whose width considerably decrease from one end to the other this arrangement permits to save operating time in that the slides will not have to carry out a longitudinal movement corresponding to the full length of workpiece and template, respectively, but only a movement which corresponds to the length of the workpiece with predetermined width. Thus the reverse movement of the slides will always be effected when workpiece and tool move out of contact with each other, i.e. when the tool is out of reach of the workpiece and cannot be any more effective.

Upon each reversal of the two slides 2 and 11 in longitudinal direction, the cross slide 6 will simultaneously be moved along the cross traverse 5 in horizontal direction by a predetermined amount or step so that feeler member 14 and tool 15 will carry out equal transverse movements with respect to template and workpiece, respectively.

As will be noted from Fig. 1 the axis of rotation of the tool 15, for instance, a milling cutter or a grinding wheel extends substantially parallel with respect to the direction of feed, i.e. parallel with respect to the longitudinal axis of the workpiece 13.

When a workpiece as, for instance, shown in Fig. 1 and indicated at 13 is of extended length, is accurately shaped and has a convex surface and has converging side edges i.e. is tapered towards its rear end, is to be milled by a device made according to the present invention a template will be first prepared the length of which is, for instance, one tenth of the length of the workpiece 13. This template corresponds in width at its front and rear end to the front and rear ends of the workpiece 13. The template is then secured on the template slide 11 and the speed gear operatively connecting the two slides is adjusted such that the movements or rates of speed of the aforesaid two slides correspond to the respective length of said template and said workpiece. In the case where the length of the template is one tenth of the length of the workpiece the ratio between the rate of feed of the template slide and the rate of feed of the workpiece slide will be 1:10. The ratio of length between the template and workpiece may, within certain limits, also be larger or smaller than one tenth.

It will be noted that template and workpiece have to be attached to the respective slides so that corresponding marking or reference lines on workpiece and template extend parallel to each other. Suitably such reference lines may be constituted by corresponding longitudinal edges of said workpiece and template.

Feeler member 14 is then adjusted or positioned at the edge 12a of the template and tool 15 is correspondingly positioned at edge 13a of the workpiece 13. This adjustment is effected by individual movement of the two slides along their beds either manually or mechanically. After this adjustment has been effected the two slides are brought into operative connection with each other by means of the speed gear 25 or a coupling is interposed in this connection and the drive for the slides (not shown) is put in operation. The feeler member 14 will then explore or scan the upper surface of the template in longitudinal direction while at the same time the tool 15 will move longitudinally of the workpiece 13 and machine the latter.

At the marginal portions of workpiece and template reversing of movement of the two slides in longitudinal direction will be effected by the aforesaid contacts 19 abutting against the contact rails 18 whereas in the more centrally located portions of workpiece and template this reverse movement of slides 2 and 11 will be brought about by the stop member 16 abutting against a reversing device 17 well known in the art. At the same time, the cross slide 6 will always be moved in transverse direction by one step so that the template will be explored or scanned over its entire area in a plurality of longitudinally extending parallel planes. Adjacent ones of these planes are spaced from each other by one step.

Consequently the workpiece will be machined in the same manner by the tool 15 due to the fact that the cutting step, i.e. the transverse movement upon each reversing or return longitudinal direction is the same for feeler member 14 and tool 15 and, furthermore, due to the movements of said feeler member and said tool being equal in vertical direction.

Since in addition the two slides 2 and 11 are driven at rates of speed which correspond to the respective length of the workpiece and template, the position of the cutting tool 15 at the workpiece will always correspond to the position of the feeler member 14 at the template and consequently, the two slides will reach their reversing positions at the same time.

Due to the fact that the axis of rotation of the tool 15 extends parallel with respect to the longitudinal axis of the workpiece and parallel to the direction of feed, the tool will work in both directions of movement of the two slides, i.e. cut or grind with its side faces thereby covering or machining an area corresponding to the size of the transverse cutting step. The conditions for machining or cutting and the conidtions for the removal of the chips are therefore the same in both directions of movement or feed of the workpiece 13 by means of slide 2, whereby a uniform appearance of the machined surface and a high surface quality may be obtained.

Figure 3:
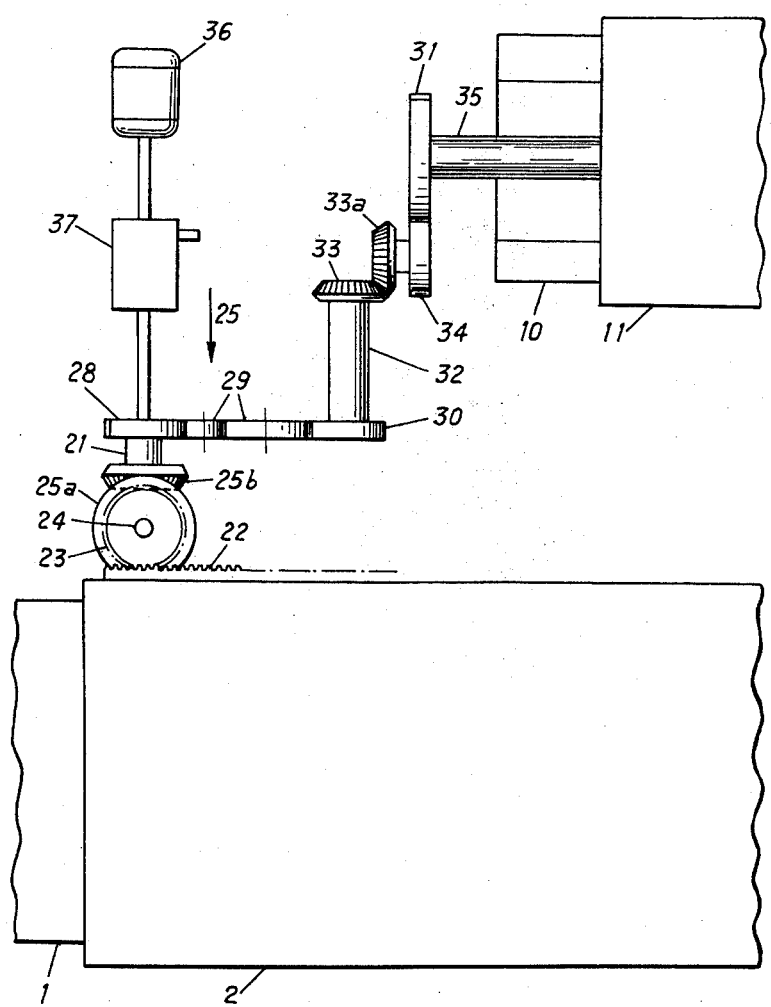
Fig. 3 is a schematic representation of the transmission between the workpiece slide and the template slide seen in Fig. 1.

In Fig. 3 the variable speed transmission or speed gear means 25 interconnecting the workpiece slide 2 with the template slide 11 are schematically shown. As will be noted from Fig. 3 the workpiece slide 2 is provided with a rack 22 extending over the length thereof. A gear wheel 23 meshing with the rack 22 is seated on a shaft 24 carrying a bevel gear 25a. The latter is in engagement with a bevel gear 25b connected by a sleeve 27 with a pinion 28. Through a pair of change-speed gear wheels 29 this pinion 28 is in engagement with a pinion 30, the latter being operatively connected with a gear wheel 31 via a shaft 32, a pair of bevel gears 33, 33a, and a pinion 34. Gear wheel 31 is seated on a spindle 35, driving the template slide 11 in a conventional manner (not shown).

It will be understood that the pair of change-speed gear wheels 29 may be chosen to produce a suitable speed ratio between the movements of slides 2 and 11.

Fig. 3 furthermore indicates drive means for the two slides, constituted by an electric motor 36 which is operatively connected with the pinion 28 over a variable speed gear 37, the latter serving to adjust the speed of slide 2 in accordance with the machining conditions.

It will be noted that numerous other mechanical transmissions may be used to replace the one shown in Fig. 3. Moreover, hydraulic or electric transmissions may be employed. It is, however, of importance that the transmission chosen must be capable of transforming the movement of the slide for the workpiece at an adjustable ratio to a movement of the slide for the template, while during one and the same operation this ratio must be accurately maintained, i.e. kept constant. The transmission members must, therefore, operate without any play.

As has been mentioned before, it is possible to use as a tool either a cutting tool in the form of a milling cutter or a grinding wheel. The manner of machining being the same with all types of tools employed. The described operation may naturally be carried out with a device wherein the template and the workpiece remain stationary and variation of the movements are carried out solely by the feeler or scanner and the tool. In this case, however, the movement of the feeler would have to be slower in longitudinal direction than the movement of the tool to compensate for the difference in length between template and workpiece.

Whereas Fig. 1 has been described in connection with a speed gear mechanism operatively connecting template slide and workpiece slide to carry out their respective longitudinal movements, it will be understood that also an arrangement is possible which makes use of hydraulic or electric transmission means to effectuate a synchronized movement of the two slides.

Figure 2:
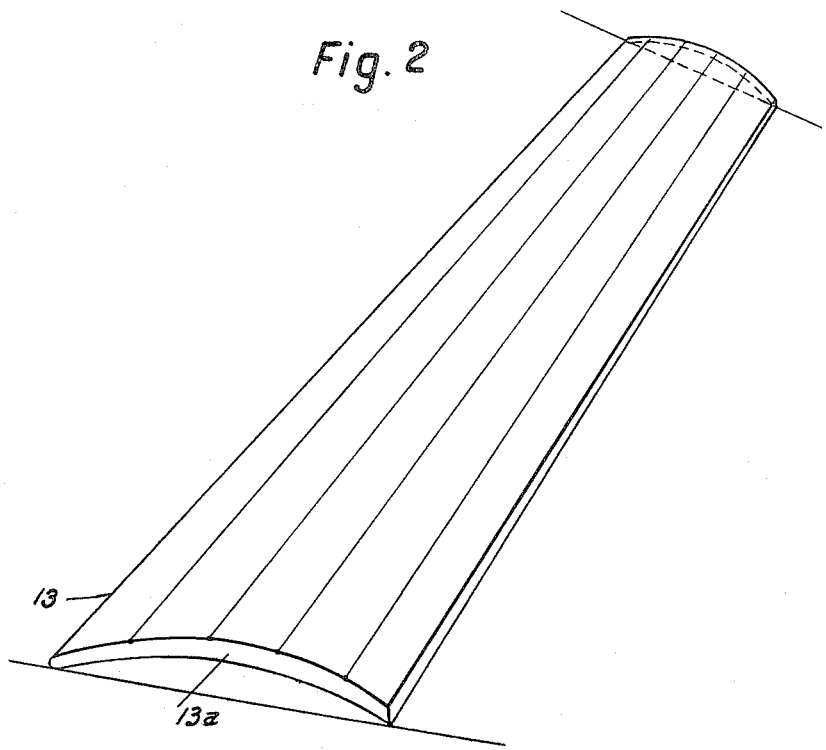
Fig. 2 is a perspective view of a workpiece which may be produced by the machine embodying the invention.

The workpiece shown in Fig. 2 may, of course, not only be machined in the described manner on its convex surface, but also on its concave side. It is, therefore, also possible to use templates of different lengths for the machining of the two sides, i.e. templates which are shortened with respect to the workpiece to an unequal degree or extent. This may be especially suitable in a case where the one surface of the workpiece is relatively uneven with respect to the other, such as a workpiece having transversely extending ribs or like projections.

In order to machine a workpiece surface of such configuration it will be suitable to use a template the length of which is relatively less reduced with respect to the template employed to machine a relatively even surface. Therefore, a predetermined accuracy may be obtained irrespective of the configuration of the workpiece surface to be machined.

Method means for machining a workpiece as hereinabove described does not only permit the reduction in the cost of the template, but it will also permit to save space for erecting the machine tool. Moreover, the machining times may be shortened and the quality of the surface will be greatly improved. The tool will have a longer life due to the fact that, on the one hand, the operating conditions are at a maximum and, on the other hand, the idle periods of time are reduced to a minimum by taking advantage of the repeated reversing movements of the feeler with respect to the template and of the tool relative to the workpiece.

In brief, the operation of the device is as follows: A workpiece 13 and a template 12 having one dimension different from said workpiece are placed on their respective sides, namely 2 and 11. The aforementioned dimension of the template, which is different than the desired dimension to be attained on the workpiece, governs the setting of the speed gear 25, which operatively connects the respective slides of the template and workpiece. The speed gear is then set to move the respective slides at the desired rate of speed with respect to each other. The feeler member 14 and the tool 15 are then positioned at the edges 12a, 13a, of the template 12 and workpiece 13, respectively.

The machine is then started and the speed gears move the respective slides of the desired predetermined rate. The feeler member now scans or explores one surface increment of the template in a longitudinal direction while simultaneously the tool also moves relative to the workpiece in a longitudinal direction and machines the latter in accordance with the configuration of the template. After the feeler member 14 and the tool 15 have each performed one feed movement on the surface of the template and workpiece, respectively, the direction of relative movement between the feeler member and the template, and the workpiece and tool are reversed. The scanner simultaneously moves in a transverse direction so that the template will now be explored over a different surface increment lying in a longitudinally extending parallel plane.

Upon the movement of the template transversely with respect to the feeler, the tool is also moved at the same rate transversely with respect to the workpiece to thereby form the corresponding surface increment of the latter. Thus, it is apparent that upon subsequent reversal of the longitudinal movement of the feeler relative to the template, and the tool relative to the workpiece accompanied by transverse movements of the feeler and tool relative to the template and workpiece, respectively, the workpiece will be shaped and formed in accordance with the configuration of the template.

Thus, a workpiece can be formed from a template having at least one dimension different than that of the desired configuration of the workpiece with resulting saving in material and space.

Various changes and modifications may be made without departing from the spirit and scope of the present invention, and it is intended that such obvious changes and modifications be embraced by the annexed claims.

Having thus described the invention, what is claimed as new and desired to be secured by Letters Patent is:

1. A machine for copying a lengthy workpiece from a template by means of a rotary tool, comprising first guide means, first slide means supported on said first guide means for reciprocatory movement therealong, a template carried by said first slide means, second guide means extending in parallel and spaced relation to said first guide means and substantially greater in length than said first guide means, second slide means supported on said second guide means for reciprocatory movement therealong, said second slide means being substantially longer than said first slide means and adapted to carry a lengthy workpiece, third guide means extending above said first and second slide means and transversely thereto and supported for upward and downward movement, third slide means mounted on said third guide means for movement therealong, scanning means slidably mounted on said third slide means for adjustment with respect to said tool when held by said tool holding means and also for movement perpendicularly with respect to said template when mounted on said first slide means, a rotary tool supporting means connected to said third slide means for movement therewith and holding said tool for rotation about an axis parallel to said first and second guide means and for cooperation with said lengthy workpiece when mounted on said second slide means, drive means operatively connected to said second slide means for imparting said reciprocatory movement thereto, speed reducing transmission means constituted by a mechanical speed gear operatively interconnecting said first slide means with said second slide means for transmitting said reciprocatory movement to said first slide means at a reduced rate of speed, respective actuating means for said third slide means to impart thereto said movement along said third guide means in step-by-step fashion and for said third guide means to impart thereto said upward and downward movement commensurate with said perpendicular movement of said scanning means to thereby move said tool perpendicularly with respect to said workpiece.

2. A machine according to claim 1, including a pair of spaced contact rails on said first slide means, and a pair of contacts mounted on said scanning means for cooperation with said pair of contact rails in predetermined positions of said scanning means relative to said first slide means, to thereby control reciprocatory movement in accordance with the extent of said template, said pair of contact rails being adjusted to follow said template when mounted on said first slide means, said scanning means being slidably mounted on said third slide means for adjustment with respect to said tool, when held by said tool holding means, said speed reducing transmission means being constituted by a mechanical speed gear.

3. A machine according to claim 1, variable speed transmission means operatively interposed between said drive means and said second slide means.

References Cited in the file of this patent

UNITED STATES PATENTS

| | | |
|---|---|---|
| 1,669,905 | Keller | May 15, 1928 |
| 2,753,764 | Stephenson | July 10, 1956 |
| 2,793,569 | Tanner et al. | May 28, 1957 |

FOREIGN PATENTS

| | | |
|---|---|---|
| 912,040 | Germany | May 24, 1954 |
| 1,035,407 | France | Apr. 15, 1953 |